United States Patent [19]

Sato et al.

[11] Patent Number: 5,928,531
[45] Date of Patent: Jul. 27, 1999

[54] MOTOR-DRIVEN RESISTANCE SPOT WELDING MACHINE

[75] Inventors: Yoshio Sato; Junichi Taniguchi; Keiji Kameta, all of Kanagawa, Japan

[73] Assignee: Dengensha Manufacturing Company, Limited, Kanagawa, Japan

[21] Appl. No.: 08/928,483

[22] Filed: Sep. 12, 1997

[30] Foreign Application Priority Data

| Sep. 13, 1996 | [JP] | Japan | 8-265276 |
| Nov. 1, 1996 | [JP] | Japan | 8-307200 |
| Jan. 20, 1997 | [JP] | Japan | 9-021084 |

[51] Int. Cl.⁶ .................................................. B23K 11/11
[52] U.S. Cl. ................................... 219/86.25; 219/90
[58] Field of Search ........................... 219/86.1, 86.25, 219/86.33, 89, 90, 116

[56] References Cited

U.S. PATENT DOCUMENTS

| 1,280,818 | 10/1918 | Nikonow | 219/90 |
| 2,542,629 | 2/1951 | Clawson | 219/90 |
| 3,008,034 | 11/1961 | Wolfbauer | 219/89 |
| 4,684,778 | 8/1987 | Cecil | 219/89 |
| 4,924,055 | 5/1990 | Nakahigasi et al. | 219/86.33 X |
| 5,750,953 | 5/1998 | Sato et al. | 219/90 |
| 5,818,007 | 10/1998 | Itatsu | 219/86.25 |

FOREIGN PATENT DOCUMENTS

| A10424190 | 4/1991 | European Pat. Off. . |
| A10761367 | 3/1997 | European Pat. Off. . |
| 6-315772 | 11/1994 | Japan . |
| 7-124753 | 5/1995 | Japan . |
| 7-31899 | 7/1995 | Japan . |
| 7-232282 | 9/1995 | Japan . |
| 8-132247 | 5/1996 | Japan . |

OTHER PUBLICATIONS

Patent Abstracts of Japan vol. 96, No. 1, Jan. 31, 1996 & JP 07 236981 A (Dengensha Mfg Co Ltd) Sep. 12, 1995, *Abstract.

Patent Abstracts of Japan, vol. 96, No. 6, Jun. 28, 1996 & JP 08 039262 A (Dengensha Mfg Co Ltd) Feb. 13, 1996 *Abstract.

Patent Abstracts of Japan, vol. 15, No. 481 (M–1187), Dec. 6, 1991 & JP 03 207579 A (Matsushita Electric Ind Co. Ltd), Sep. 10, 1991 *Abstract.

Patent Abstracts of Japan, vol. 95, No. 8, Sep. 29, 1995 & JP 07 124753 A (Toyota Motor Corp), May 16, 1995 *Abstract.

*Primary Examiner*—Gregory Mills
*Attorney, Agent, or Firm*—Sughrue, Mion, Zinn, Macpeak & Seas, PLLC

[57] ABSTRACT

A motor-driven resistance spot welding machine includes: a drive rod having an electrode tip on an end thereof and making a linear motion; a linear guide for guiding the linear motion of the drive rod, the linear guide including a bearing; and a reduction gear being supported by a gun arm or a gun bracket. The machine also linearly drives the drive rod in an electrode force direction by transmitting an output torque of an electric motor to the reduction gear. In the machine, a rear portion of the drive rod is connected to a swing lever through a link, the swing lever being secured either to an output shaft of the reduction gear or to a main body of the reduction gear, whereby an arcuate motion is transmitted to the swing lever by an output of the electric motor, and is then converted into a linear motion of the drive rod by the link to thereby drive the drive rod so as to apply electrode force. As a result of this construction, the reduction gear is sealed, so that the reduction gear is free from welding splashes. Such problems as the large moment of inertia ($GD^2$) and the restricted strokes of the ball-bearing leadscrew and the nut can be overcome. Further, gun parts are grouped by function. That is, the functions are unitized into a drive unit for generating electrode force, and a welding unit including the electrode tips, the gun arm, the welding transformer, and the like, so that parts are unitized into common parts so as to be standardized. Further, a new bracket which can be used irrespective of the posture of the gun attached to the robot can be realized.

7 Claims, 5 Drawing Sheets

MOTOR-DRIVEN RESISTANCE SPOT WELDING MACHINE

BACKGROUND OF THE INVENTION

The invention relates to resistance spot welding machines. More particularly, the invention is directed to a motor-driven resistance spot welding machine including a robot welding gun.

A conventional motor-driven C-type spot welding gun for a robot is designed as follows. An electrode force applying mechanism in which a ball-bearing leadscrew is set into a nut that is interlocked with the output shaft of an electric motor through transmission means, is secured to one end of a C-type gun arm, and a pair of electrode portions confronting each other are disposed on an end of the ball-bearing leadscrew and the other end of the gun arm, respectively. By causing the electric motor to rotate the nut, the ball-bearing leadscrew is driven linearly to thereby apply electrode force (see Japanese Utility Model Publication No. Hei. 7-31899).

Further, the following electrode force applying methods have heretofore been proposed to drive a conventional C-type motor-driven resistance spot welding gun. One method of applying electrode force involves the steps of: causing a pinion rotated by an electric motor to mesh with a rack having an electrode portion disposed thereon; and causing the electric motor to rotate the pinion with the rack held in a bearing fixed at the side of a gun arm, so that the rack makes a linear motion. Another method involves the step of causing a shaft brought into slidable contact with a cam driven by an electric motor to move linearly, so that an electrode portion disposed on an end of the shaft is driven to apply electrode force (see Japanese Patent Unexamined Publication No. Hei. 7-124753).

However, the following problems have heretofore been addressed in these conventional arts.

First, the former apparatus employing a ball-bearing leadscrew and a nut has suffered from the following problems.

(1) The rotating section is susceptible to wear due to entrance of welding splashes (tiny iron particles). When the tiny particles scattering at the time of welding enter into the ball-bearing leadscrew, these tiny iron particles circulate deep into the leadscrew together with the balls, which in turn causes a fatal damage such as galling. Therefore, adequate preventing measures against entrance of the tiny iron particles must be taken. However, it is practically impossible to perfectly prevent the entrance of the tiny iron particles for a long term.

(2) The electrode reciprocates between an open position and a pressing position to a workpiece at each welding. That is, the electrode repeats the cycle of stop and movement. At each cycle of stop and movement, a motor must be rotated at from 0 rpm to 1000–3000 rpm within a period as short as 0.05 to 0.1 sec. That is, the rotation of the motor must be speeded up in a short time. However, in order to meet this requirement, the capacity of the motor must be increased since the moment of inertia ($GD^2$) of the ball-bearing leadscrew and the nut are larger by one order of digit than that of the reduction gear of the invention.

(3) Further, grease is splashed due to high-speed rotation of the ball-bearing leadscrew, which in turn makes it practically difficult to maintain sufficient lubrication continuously. Therefore, it is also difficult to allow the ball-bearing leadscrew to complete a design life thereof.

(4) The length of the gun main body is increased in association with the distance of the ball-bearing leadscrew moved, which in turn causes the gun-main body to interfere with the robot wrist. In order to avoid the interference, the surface of the robot onto which the gun bracket is mounted must be extended backward. The possibility of downsizing is disadvantageously restricted.

(5) The length of a ball-bearing leadscrew must be changed so as to correspond to the specified maximum stroke of guns. In addition, the ball-bearing leadscrews, being special precision parts, are not suitable for mass production, so that the cost and appointed date of delivery of the leadscrews impair the productivity of welding guns.

The latter apparatus employing a rack and a pinion has suffered from the following problems.

(1) Welding splashes tend to deposit on the stepped portions of teeth. When welding splashes enter into the meshed portion between the rack and the pinion, excessive load is applied to the toothed surfaces, which results in a fatal damage to the apparatus.

(2) It is difficult to take effective welding splash preventing measures for overcoming the aforementioned problem. Since the teeth of the rack project out by a distance exceeding a stroke in each of both sides from the axial center of the pinion, a cover must be put over the entire part of the rack and the pinion. As a result, the gun becomes large in structure as a whole. In addition, even if a dust seal or a metal scraper is employed as a splash preventing measure, such measure is technically difficult for the teeth of the rack which are of stepped shape.

(3) To prevent the teeth of the rack and pinion from wearing quickly, grease must be continuously supplied to the tooth surfaces. The teeth of the rack move a distance exceeding a stroke in each of both sides from the shaft center of the pinion. It is difficult to design and fabricate a cover that can close the rack perfectly-while allowing the rack to breathe inside the cover with the rack moving to and fro.

(4) The rack needs a guide mechanism so that the center of the electrode portion attached to the end of the rack is not displaced. The structure of such guide mechanism becomes complicated if the rack has a rectangular cross section, and a separate guide rod must be provided if the rack has a round cross section. Therefore, considerations must be given to avoiding interference between the guide mechanism and the workpiece.

(5) It is a fatal restriction that the maximum open stroke is only about several millimeters in a mechanism involving a cam and a shaft. A maximum open stroke of ten-odd centimeters is generally required for a spot welding gun. Therefore, such mechanism is not applicable to the spot welding gun.

As described above, both the rack and pinion mechanism and the conventional cam and shaft mechanism are not suitable as pressing mechanism of the welding gun.

Generally speaking, conventional welding guns of this type require a dedicated gun bracket that allows a gun to be mounted on a robot arm. Therefore, a newly designed gun according to customer's specification, requires a large number of engineering and manufacturing hours, and suffers from the problem of difficulty in unitized standard parts for each function. As a result, there has been a fact that the same part can not be used for welding guns because of slight difference in the specification though the functions of the welding guns are quite identical to each other.

SUMMARY OF THE INVENTION

The invention has been made to overcome the aforementioned problems. Specific technical means to overcome the problems are as follows.

A first aspect of the invention is characterized by providing the following technical means. A gun arm having one of electrode tips is supported by a gun bracket; a drive rod for driving the other electrode tip corresponding to the one electrode tip is guided and supported by a linear guide that is supported by the gun bracket or the gun arm; a mechanism for linearly driving the drive rod includes an electric motor for generating the torque for electrode force necessary for welding between the electrode tips, a reduction gear for transmitting the motor torque to the electrode tip of the drive rod as electrode force, and an swing member being supported by an output shaft of the reduction gear and being coupled to the drive rod. In addition, the drive mechanism is releasably mounted on the gun bracket so as to be concentric with the center of the output shaft of the reduction gear, so that the drive mechanism substantially constitutes a standardized drive unit.

According to the first aspect of the invention, the welding gun can be mounted on a robot arm by arbitrarily changing the gun bracket mounting posture to a robot arm in the range of 360° so as to be concentric with the reduction gear output shaft center X independently of the gun mounting angles. Further, functions are grouped into units. That is, the functions are unitized into the electrode force applying drive unit, and the welding unit not only including the gun arm with the electrode tip, but also including the welding current conducting portion such as the welding transformer and the secondary conductors, so that parts are unitized into common parts so as to allow each common part to function independently. As a result, gun brackets can be standardized, each of which has heretofore required a large number of engineering and manufacturing hours according to customer's specification but also suffered from the problem of difficulty in unitized standard parts for each function. Hence, not only a common drive unit can be used, but also a common gun bracket can be used irrespective of the welding gun mounting posture to a robot arm, which in turn provides a great advantage in terms of productivity, parts replacement, maintenance, and economy.

According to a second aspect of the invention, a motor-driven resistance spot welding machine characterized in that: an apparatus includes: a drive rod having one of electrode tips on an end thereof and making a linear motion; a bearing for linearly guiding the drive rod; and a reduction gear being supported by a gun arm or a gun bracket; and further, the apparatus linearly drives the drive rod in an electrode force direction by transmitting the output torque of an electric motor to the reduction gear. In the above apparatus, a rear portion of the drive rod is connected to a swing lever through a link, the swing lever being secured either to an output shaft of the reduction gear or to a main body of the reduction gear, whereby an arcuate motion is transmitted to the swing lever by an output of the electric motor, and is then converted into a linear motion of the drive rod by the link mechanism to thereby drive the drive rod so as to apply electrode force.

According to the second aspect of the invention, the reduction gear is closed, so that the reduction gear is free from welding splashes. By using a conventionally known reduction gear for transmitting a rotational output of an electric motor as an electrode force transmitting means for a C-type spot welding gun, the shortcomings associated with the ball-bearing leadscrew and the nut that have been used in a conventional motor-driven spot welding gun can be overcome. That is, the shortcoming that the ball-bearing leadscrew and the nut are susceptible to welding splashes can be overcome by the use of the reduction gear. In addition, the shortcoming that a ball-bearing leadscrew whose length corresponds to a gun stroke must be prepared for each gun having different stroke according to customer's requirement, and the other shortcoming that the ball-bearing leadscrew and the nut have a large moment of inertia ($GD^2$) are also overcome by the use of the reduction gear.

Further, while applying the merits of the reduction gear that has been already used as a drive means of a motor-driven X-type spot welding gun (the merits being welding splash resistance, small $GD^2$, nonrestriction of swing angles which means nonrestriction of opening amount of arms of an X-type gun, etc.) to a motor-driven C-type spot welding gun, the problems arisen from the ball-bearing leadscrew, and from the rack and the pinion can be overcome by means of an epoch-making electrode force applying mechanism that employs such mechanisms as the reduction gear, the swing lever, the link, and the linear guide. As a result, durability and productivity of C-type welding guns can be improved very much.

Further, according to third and fourth aspects of the invention, a combination of angular bearings couples the link, the swing lever and the drive rod with a pre-load. Therefore, the coupled portion can serve also as a guide mechanism which prevents the drive rod to rotate and keeps alignment of electrode tips, which in turn dispenses with a separately arranged guide means required in the conventional examples. Hence, the structure can be simplified.

According to a fifth aspect of the invention, in a motor-driven spot welding gun for robot for instance, a welding transformer supported by the gun bracket is arranged in such a manner that a centerline Q along the length of the welding transformer crosses substantially at right angles (90°) to an axial centerline Z of the drive rod. As a result of this construction, the welding gun can be arranged compactly, which in turn allows a load applied to the wrist of a robot arm to be reduced.

Further, according to a sixth aspect of the invention, the rear portion of the drive rod is connected to secondary terminals of the welding transformer through flexible copper plates (flexible shunt). As a result of this construction, second terminals and cooling pipings for the welding transformer can be located at the rear side of the welding gun, which in turn the area around the electrode tips can provide enough room for workpiece and workpiece fixing tools. Hence, the possibility of secondary terminals and cooling pipings interfering with a workpiece or workpiece fixing tools can be reduced.

A seventh aspect of the invention is characterized as providing the following technical means. An apparatus includes: a drive rod having one of electrode tips on an end thereof and making a linear motion; a bearing for linearly guiding the drive rod; and a reduction gear being supported by a gun bracket or a gun arm having the other electrode tip corresponding to the one electrode tip. Further, the apparatus linearly drives the drive rod in an electrode force direction by transmitting the output torque of an electric motor to the reduction gear for electrode force. In the above apparatus, cam followers are arranged on a rear portion of the drive rod; a swing lever is secured either to an output shaft of the reduction gear or to a main body of the reduction gear; and the cam followers of the drive rod are set into a cam groove formed in the swing lever, whereby the drive rod is coupled to the swing lever, and an arcuate motion is thus transmitted to the swing lever by an output of the electric motor, and is converted into a linear motion of the drive rod by the movement of the cam followers within an elongated hole allowable range of the cam groove, to thereby drive the drive rod so as to apply the electrode force.

According to the seventh aspect of the invention, by using a conventionally known reduction gear for transmitting a rotational output of an electric motor as an electrode force applying means for a C-type spot welding gun, the shortcomings associated with the ball-bearing leadscrew and the nut that have been used in a conventional motor-driven spot welding gun can be overcome. That is, the shortcoming that the ball-bearing leadscrew and the nut are susceptible to welding splashes can be overcome by the use of the reduction gear. In addition, the shortcoming that a ball-bearing leadscrew whose length corresponds to a gun stroke must be prepared for each gun hating different stroke according to customer's requirement, and the other shortcoming that the ball-bearing leadscrew and the nut have a large moment of inertia ($GD^2$) are also overcome by the use of the reduction gear.

Further, while applying the merits of the reduction gear that has been already used as a drive means of a motor-driven X-type spot welding gun (the merits being welding splash resistance, small $GD^2$, nonrestriction of swing angles which means nonrestriction of opening amount of arms of an X-type gun, etc.) to a motor-driven C-type spot welding gun, the problems arisen from the ball-bearing leadscrew can be overcome by means of an epoch-making electrode force applying mechanism that employs such mechanisms as the reduction gear, the swing lever, the cam mechanism, and the linear guide. As a result, durability and productivity of C-type welding guns can be improved very much.

DETAILED DESCRIPTION OF THE INVENTION

A first embodiment of the invention will now be described with reference to the drawings.

Figure 1:
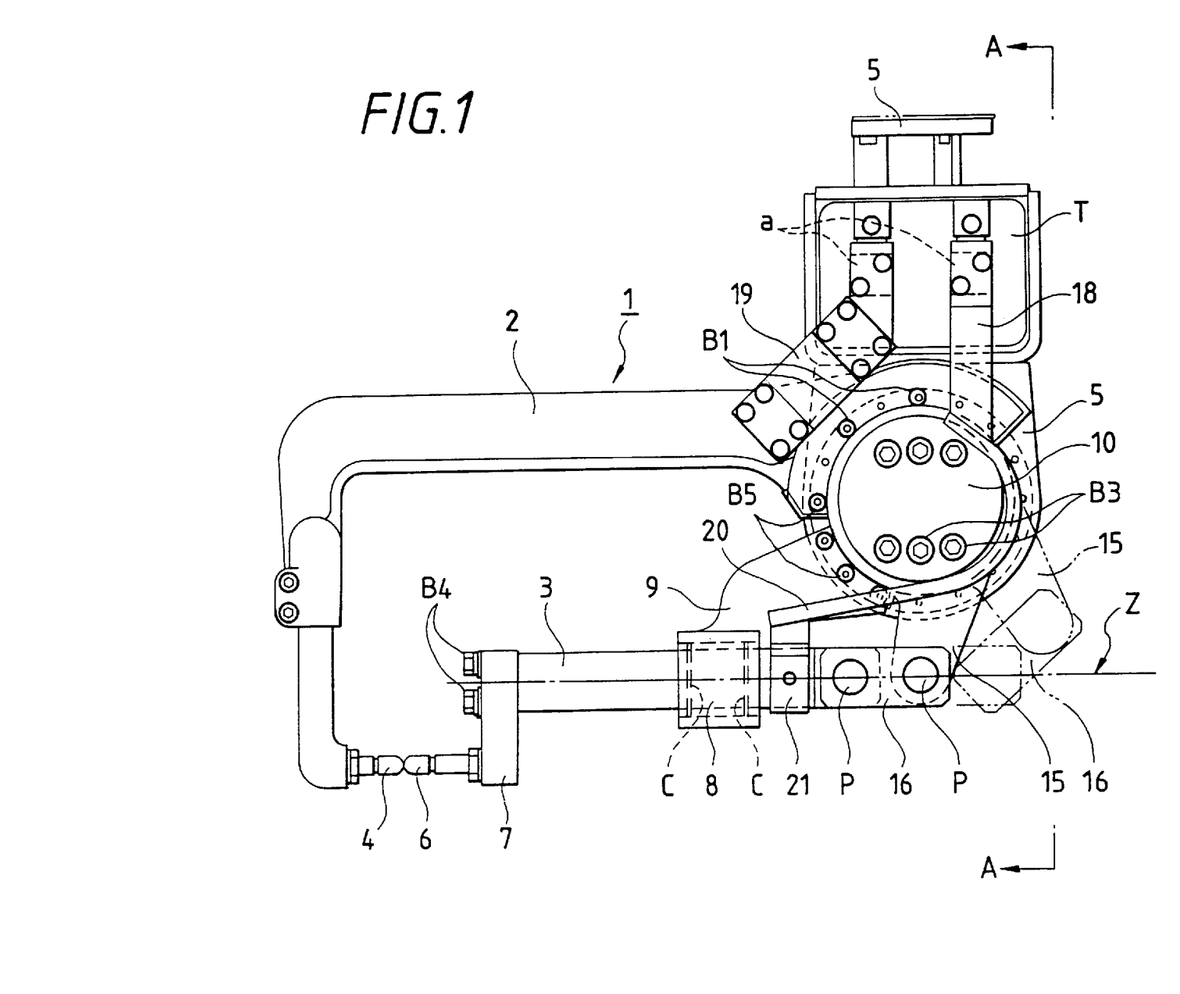
FIG. 1 is a front view of the entire part of a gun, which is a first embodiment in which an apparatus of the invention is applied to a C-type spot welding gun.
Figure 2:
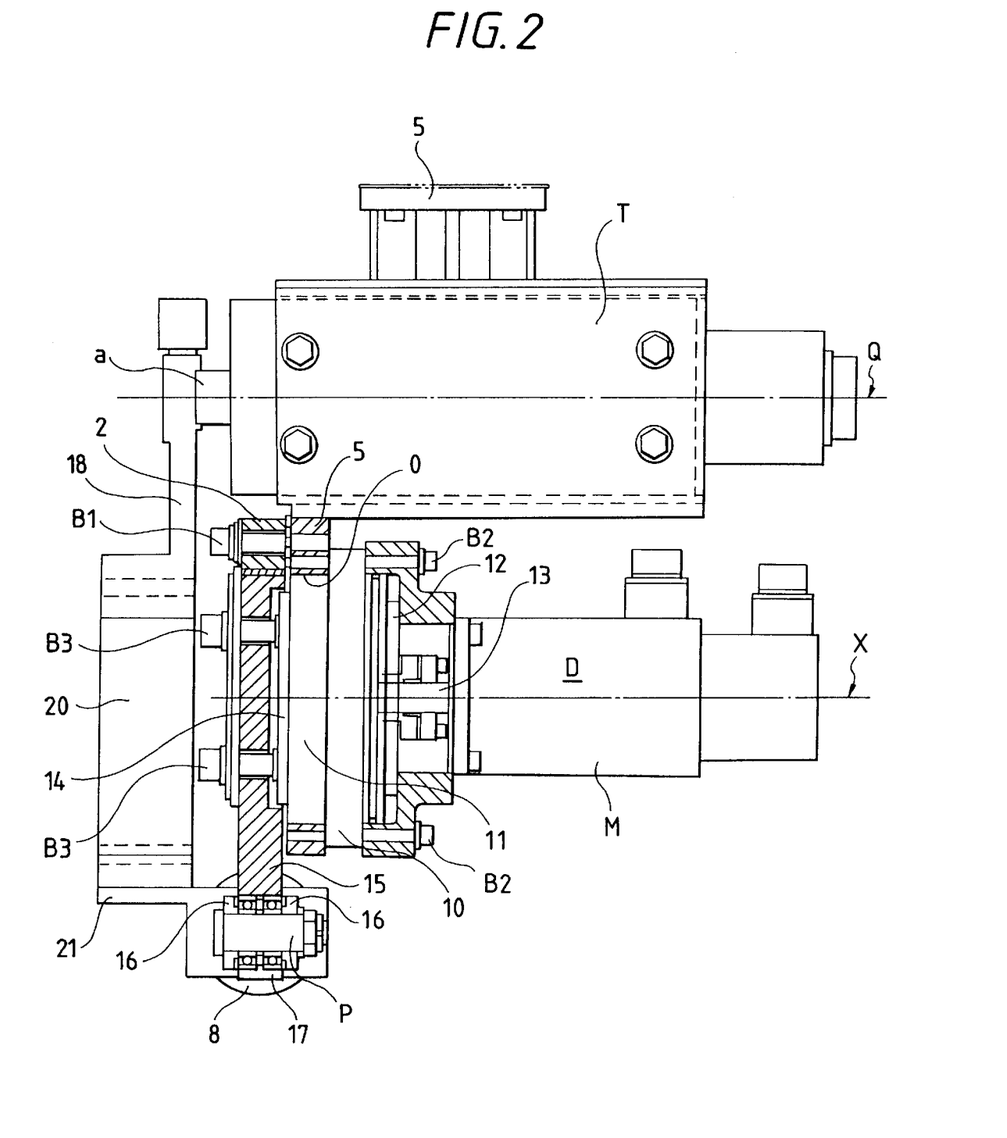
FIG. 2 is a view taken along line A—A of FIG. 1.

FIG. 1 is a diagram outlining the entire part of a gun, which illustrates the concept of a C-type motor-driven spot welding gun for embodying a method of the invention. FIG. 2 is a view taken along line A—A.

Reference numeral 1 in FIG. 1 denotes the entire part of a spot welding gun; 2, a C-type gun arm, which is insulated from a gun bracket 5 while interposing an insulating material therebetween and which is secured to the gun bracket 5 with a strong force through a plurality of bolts B1 inserted into a plurality of bolt holes formed in the circumference of the gun bracket 5 at a predetermined interval. An electrode tip 4, which is one of a pair of electrode tips, is attached to an end of the gun arm 2. Reference numeral 3 denotes a drive rod. The other electrode tip 6 confronting the electrode tip 4 is attached to an end of the drive rod through bolts B4 together with a point holder 7. Reference numeral 8 denotes a linear guide unit. The guide unit guides the drive rod by allowing the drive rod to be inserted thereinto. Generally, a bearing 8 is used as the guide unit. This bearing 8 is supported on a support arm 9 that is firmly secured to the gun arm 2 or the gun bracket 5 by a plurality of bolts B5 through an insulating member.

By selecting a bearing that incorporates a ball-circulating linear motion bearing therein and by putting covers C such as metal scrapers or dust seals to be attached to both sides of the bearing, the linear guide unit 8 can prevent entrance of welding splashes thereinto. Further, since this linear guide unit is excellent in load resistance and welding splash resistance, such linear guide unit serves best as a bearing to be disposed in proximity to the electrode tips of a welding machine. Further, when this bearing is used, it goes without saying that considerations should be given to provide an adequate guide length in order to prevent the bearing from playing with respect to the drive rod.

A welding transformer T is supported by the gun bracket 5 so as to be positioned sideways from and at right angles to the gun arm 2. The gun bracket 5 can install the gun on a robot arm (not shown) irrespective of the mounting angles of the welding gun to a robot arm as will be described later.

When a robot performs welding by a C-type welding gun, a fixed electrode tip is generally brought into contact with a workpiece, and the position where the workpiece is slightly pushed up from this contact position is programmed to a robot. This object is that when a movable electrode tip presses the workpiece, both electrode tips hold the workpiece therebetween and electrode force is applied to the workpiece at just the position where the workpiece is held by a fixture. This is known as know-how with respect to programming of a welding robot.

Assume that the fixed electrode tip does not contact with the workpiece and is positioned apart from the workpiece by about 5 mm. If the movable electrode tip presses the workpiece in this state, the workpiece is forcibly pressed to the fixed electrode tip, so that the workpiece may be deformed since it is held by the fixture. As a method of avoiding such undesirable phenomenon, an equalizing mechanism is well known. It is also possible to allow the C-type motor-driven welding gun of the invention to perform the equalizing motion by attaching a floating unit (not shown).

In general, the mechanism of equalizing motion is carried out as follows. An actuator (an electric motor or an air cylinder) for driving the movable electrode tip is supported by the gun main body that holds the other fixed electrode tip, and the gun main body is supported on a robot arm through a floating guide mechanism. As a result of this construction, the fixed electrode tip 4 is attracted toward the movable electrode tip 6 together with the gun main body by a reaction derived from the electrode force applied by the movable electrode tip 6, which in turn allows a uniform electrode force to be applied to the workpiece between both electrode tips at all times. As a result, the workpiece can be prevented from being deformed or distorted.

Reference numeral 10 denotes a reduction gear incorporated in a drive unit D. In this case, as is understood from a detailed diagram shown in FIG. 2, the reduction gear 10 assembled to the gun bracket 5 from one side of the gun bracket 5 is inserted into a unit mounting hole 0 that is formed so as to be concentric with the output shaft center X. The main body case 11 of the reduction gear 10 is then secured to the monolithically formed gun bracket 5 with a strong force collectively from one side of the gun bracket 5 by a plurality of bolts B2 that are tightened into a plurality of bolt holes formed at a predetermined interval so as to be concentric with the unit mounting hole 0. An output shaft 13 of an electric motor M is directly coupled to an input shaft 12 of the reduction gear 10.

Since the monolithically formed gun bracket 5 allows the gun arm 2 and the drive unit D to be mounted thereon from both sides thereof at arbitrary angles, the gun brackets 5 can be mounted on the robot arm together with the welding transformer while changing the position thereof arbitrarily within the range of 360° so as to be concentric with the output shaft center X of the reduction gear independently of the mounting positions (postures) of the welding gun to the robot, whether the mounting position is upward, downward, sideward (the direction shown in FIG. 1), or at other angles with respect to the ground.

While omitted in the drawings, for example, the drive unit D may be constructed in the following manner. The reduction gear 10 is mounted on a common base as a electrode force applying unit; a drive force transmitting mechanism (including transmission mechanisms such as belts, gears, and chains) is accommodated in the common base; and an output torque of a motor secured to the common base is transmitted to the reduction gear 10 through the drive force transmitting mechanism.

Reference numeral 15 denotes a swing lever secured to the output shaft 14 of the reduction gear 10 by a plurality of bolts B3. The swing lever 15 is coupled to the rear portion of the drive rod 3 through a link 16. The swing lever 15 makes an arcuate motion up to a predetermined angle (to the position shown by the chain line in FIG. 1) by the reduction gear 10, and such arcuate motion is converted into a linear motion of the drive rod 3 through the link, so that an open stroke required for the welding operation between the electrode tips can be obtained. An example in which the swing lever 15 is secured to the output shaft 14 of the reduction gear 10 is described in the embodiment of the invention. However, if the output shaft 14 is secured to the gun bracket 5, the swing lever 15 may be secured to the main body case 11 of the reduction gear 10. In this case, it is the main body case 11 that rotates to operate the swing lever 15.

Reference numeral 17 denotes a combination of angular bearings within the link. The angular bearings 17 connect the link 16 to the swing lever 15 and the drive rod 3 with a pre-load thereto so that the linear motion of the drive rod 3 can be guided by this portion. The combination of angular bearings 17 incorporates a metal seal (not shown) therein. The metal seal not only prevents grease within the angular bearing from leaking outside the angular bearing but also prevents welding splashes from entering into the angular bearing.

The coupling portion through which the drive rod 3, the link 16, and the swing lever 15 are coupled to one another may be constructed in the following manner. For example, stepped width across flats are arranged on the rear portion of the drive rod 3 and an end portion of the swing lever, and the link 16 is fixed to the width across flats of the respective members with pins P and corresponding nuts, the pins P being supported by the combination of angular bearings 17 inside the link 16. As a result of this construction, the coupling portion serves also as the guide means for the drive rod.

A bus bar 18 and a bus bar 19 are fixed to two output terminals "a" of the welding transformer T. The bus bar 18 is connected to the rear portion of the drive rod 3 through a flexible copper plate 20 and a bus bar 21, whereas the gun arm 2 is connected to the bus bar 19 either directly or through a flexible copper plate (not shown). A small-sized inverter-incorporated transformer, an ac transformer, and the like may be used as the welding transformer T. The flexible copper plate may include electrically conductive members such as a shunt, an electrically conductive cable, an aluminum-based electrically conductive plate, and a silver foiled electrically conductive plate. Water passages for circulating cooling water are formed inside each bus bar.

The operation of the thus constructed embodiment of the invention will be described. This resistance spot welding gun is mounted on the wrist of an industrial robot capable of moving with six axes of freedom for instance. Data about the motion, speeds and others required for welding have been taught on a robot in advance, so that a welding robot positions electrode tips of the welding gun on predetermined welding points in sequence based on a program having the thus taught data, and hence performs a series of welding operations automatically.

The positioning operation will be described in more detail. When a robot brings a gun to a welding point, the robot positions the fixed electrode tip at a lower surface of a workpiece from the lower side of the workpiece. Normally, actual welding point is determined and recorded in the robot controller at such point that the fixed electrode tip pushes up the workpiece slightly.

The electric motor M which acts as an actuator for seventh axis of a robot, in the case of the robot provides six axes, is operated in response to a command for applying electrode force sent from a robot controller, and the motor output is then transmitted to the output shaft 14 of the reduction gear 10. As a result, the swing lever 15 swings, which in turn causes the link 16 to be moved to close electrode tips to press a workpiece shown by the solid line in FIG. 1 from an open position shown by the one-dot chain line in FIG. 1. Hence, the drive rod 3 makes a linear motion through the linear guide unit 8. Thus, electrode force required for welding is applied to a workpiece between the electrode tips 4 and 6, and a welding current is supplied, thus spot welding is carried out.

When a spot weld is completed, the electric motor M is reversely rotated by a gun open command from the robot controller, and the swing lever 15 of the reduction gear 10 is then swung back in an opening direction up to a predetermined angle. As a result, the movable electrode tip 6 is moved up to the open position. During the gun opening operation, which is the seventh axial motion, the robot guides the welding gun to a next weld position, and the welding operation is thereafter performed similarly to the above based on the programmed control.

Thus, a series of welding operations can be performed at high speeds while substantially synchronizing the robot motion with the welding gun motion.

Another embodiment of the invention will be described next.

Figure 3:
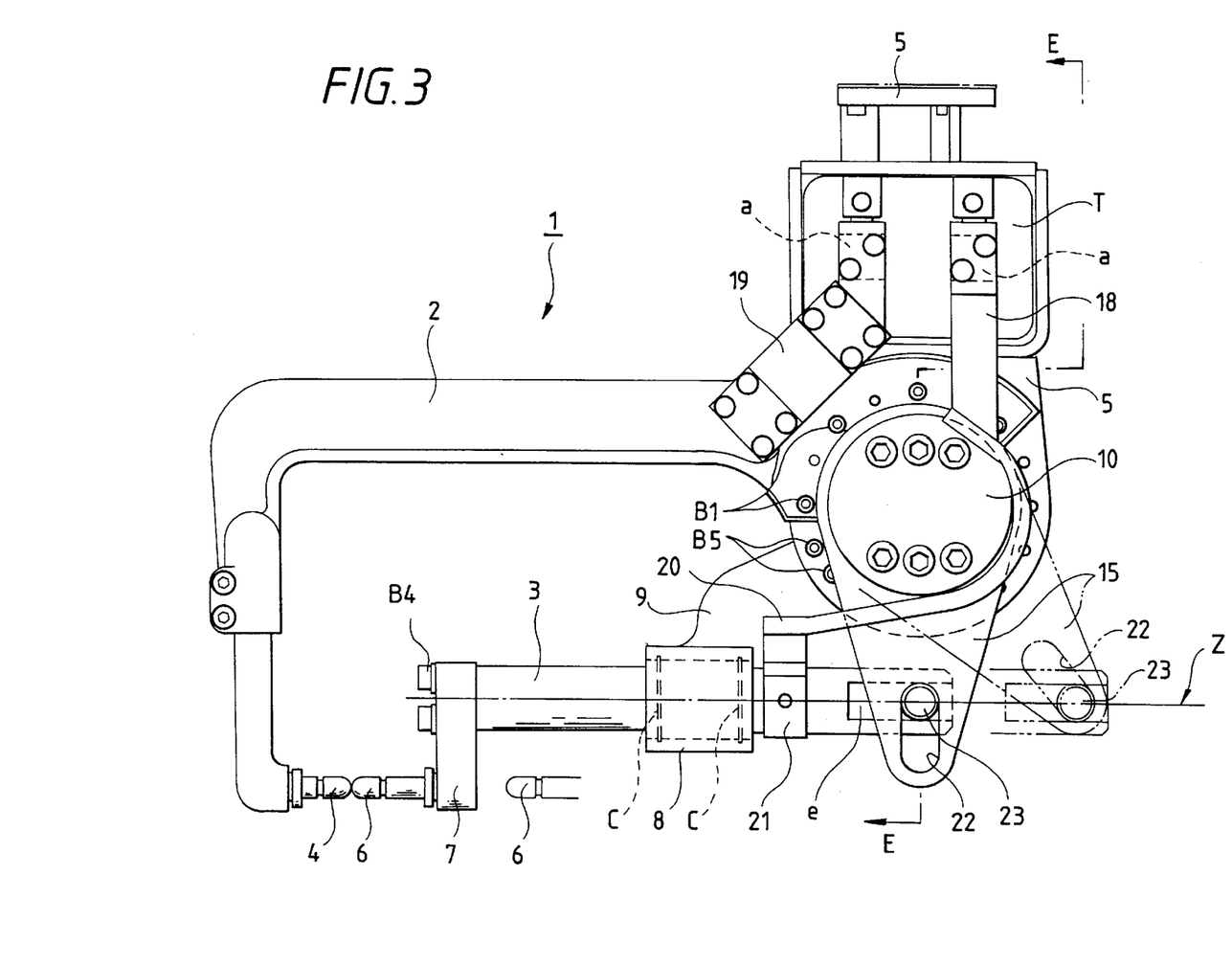
FIG. 3 is a front view of the entire part of a gun, which is a second embodiment in which an apparatus of the invention is applied to a C-type spot welding gun.
Figure 4:
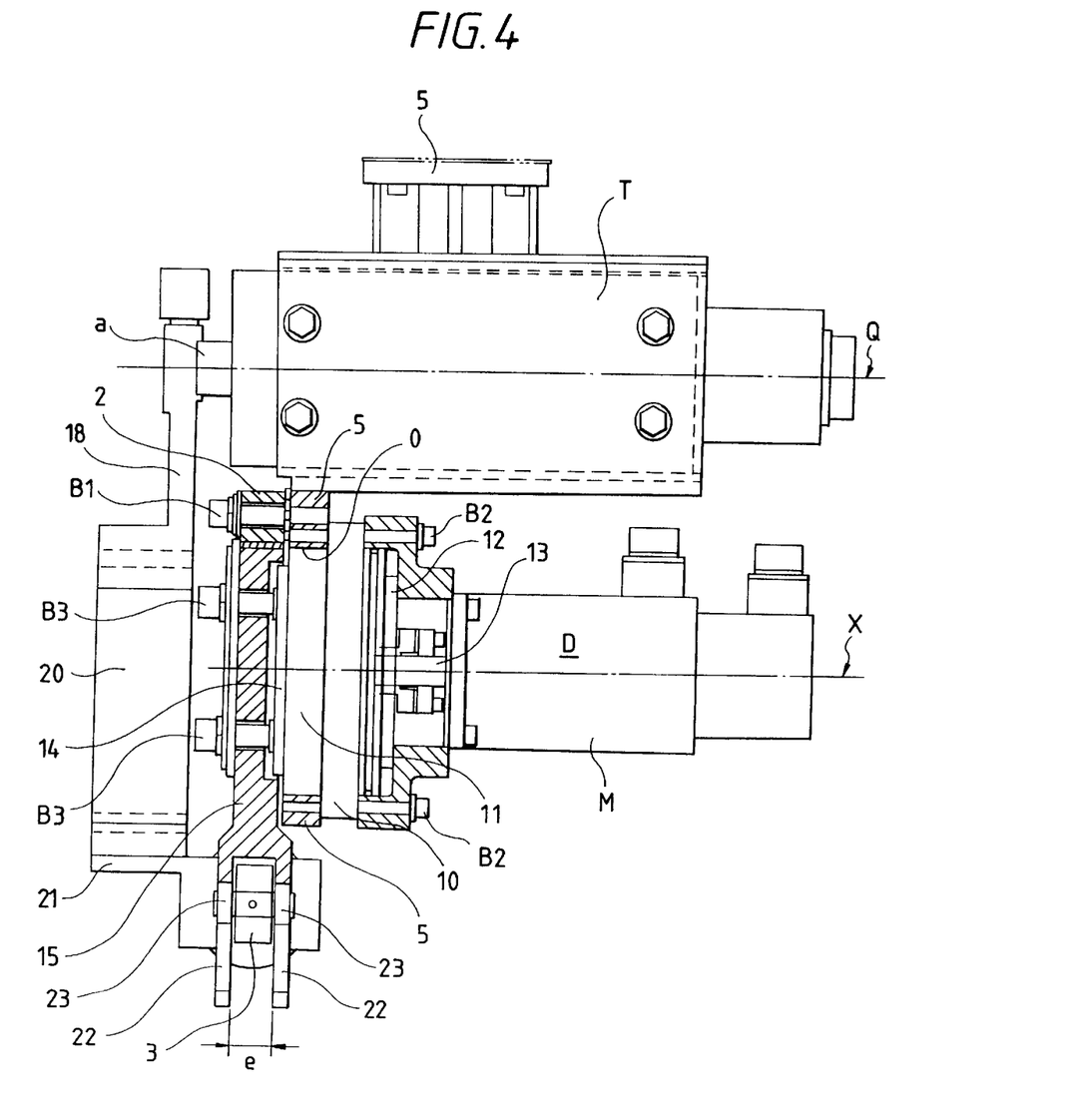
FIG. 4 is a view taken along line E—E of FIG. 3.

FIG. 3 is a diagram outlining the entire part of a gun for illustrating the concept of a C-type motor-driven resistance spot welding gun that is mounted on an industrial robot, which is a second embodiment of the invention. FIG. 4 is a view taken along line E—E.

It may be noted that in the second embodiment shown in FIGS. 3 and 4, the same parts and components as those of the first embodiment shown in FIGS. 1 and 2 are denoted by the same reference numerals.

Here, for example, a swing lever 15 is used as a swing member included in the drive unit D. The swing lever 15 is secured to the output shaft 14 of the reduction gear 10 by the bolts B3. In this case, the swing lever 15 is coupled to the rear portion of the drive rod 3 through a cam mechanism. That is, in the coupling portion that couples the drive rod 3 to the swing lever 15, stepped width across flats "e" are formed on the rear portion of the drive rod 3. A cam follower 23 is interposed between both sides of the width across flats "e", and the width across flats "e" of the drive rod 3 are inserted into a fork end with the cam follower 23 being set into an elongated cam groove 22 formed in the fork end.

In this case, the cam followers 23 are coupled with the swing lever in such a manner as to depict a moving locus within the allowable range of the elongated hole corresponding to, e.g., a distance between the cam follower center shown by the solid line and the cam follower center shown by the two-dot chain line in FIG. 3, i.e., a maximum open stroke of about 140 mm. Of course, the open/close operation from the open position to closed position of the electrode tips is subjected to a continuous servo control carried out about every 1/100 mm. Therefore, accurately and freely controlled strokes at any required intermediate positions can be ensured.

The drive rod 3, constituting the cam coupling portion formed of the width across flats, the cam followers 23, and the cam groove 22 with respect to the swing lever 15, guides the linear motion of the drive rod. Further, if the swing lever and the cam mechanism including the cam followers are unitized into an exchangeable part, the coupling portion may be replaced with a link mechanism as shown in FIG. 1 if necessary.

In portions that are grouped into the welding unit, the bus bar 18 and the bus bar 19 are fixed to the two output terminals "a" of the welding transformer T. The water-cooled bus bar 21 is directly connected to the rear portion of the drive rod 3 with the bus bar 18 being connected to the bus bar 21 through the flexible copper plate 20, so that power can be fed to the drive rod 3. On the other hand, the gun arm 2 is connected to the other bus bar 19 either directly or through a flexible copper plate (not shown). An inverter-incorporated small-sized transformer, an AC transformer, or the like may be used as the welding transformer T.

The operation of the thus constructed second embodiment of the invention will hereunder be described.

The spot welding gun is mounted on the wrist of an industrial robot capable of moving with six axes of freedom for instance. Data about the motion, speeds and others required for welding have been taught on a robot in advance, so that a welding robot positions electrode tips of the welding gun on predetermined welding points in sequence based on a program having the thus taught data.

The positioning operation will be described in more detail. When a robot brings a gun to a welding point, the robot positions a fixed electrode tip of electrode tips in open position at a lower surface of a workpiece from the lower side of the workpiece. Normally, positioning is carried out at such position that the fixed electrode tip pushes up the workpiece slightly.

Then, electric motor M which acts as an actuator for seventh axis of a robot, in the case of the robot provides six axes, is operated in response to a command for applying electrode force sent from a robot controller, and the motor torque is then transmitted to the output shaft 14 of the reduction gear 10. As a result, the swing lever 15 swings, which in turn causes the cam followers 23 to be moved within the allowable range of the elongated cam groove 22 along the moving locus of the drive rod 3, thereby causing the drive rod 3 to swing to an electrode force applying position shown by the solid line in FIG. 3 from an open position shown by the two-dot chain line in FIG. 3. Hence, the drive rod 3 makes a linear motion through the linear guide unit 8. Thus, electrode force required for welding is applied to a workpiece in between the electrode tips 4 and 6, and a welding current is supplied across the electrode tips, thus spot welding is carried out.

When a spot weld is completed, the electric motor M is reversely rotated by a command for opening the gun sent from the robot controller, so that the swing lever 15 of the reduction gear 10 is swung back in the open direction up to a predetermined angle. As a result, the movable electrode tip 6 is moved up to the open position. During the gun opening operation, which is a seventh axial motion, the robot guides the welding gun to a next weld position, and the welding operation is thereafter performed similarly to the above based on the programmed control. Thus, a series of welding operations can be performed at high speeds while substantially synchronizing the robot motion with the welding gun motion for opening and closing the electrode tips.

Figure 5:
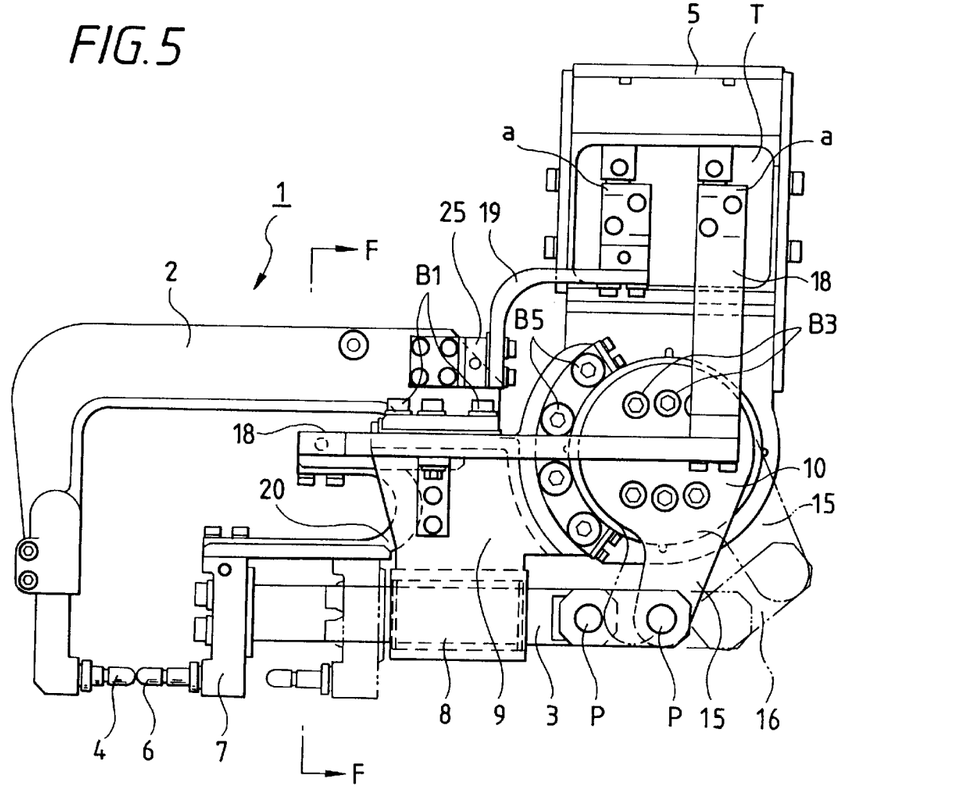
FIG. 5 is a front view of the entire part of a gun, which is a third embodiment in which an apparatus of the invention is applied to a C-type spot welding gun.
Figure 6:
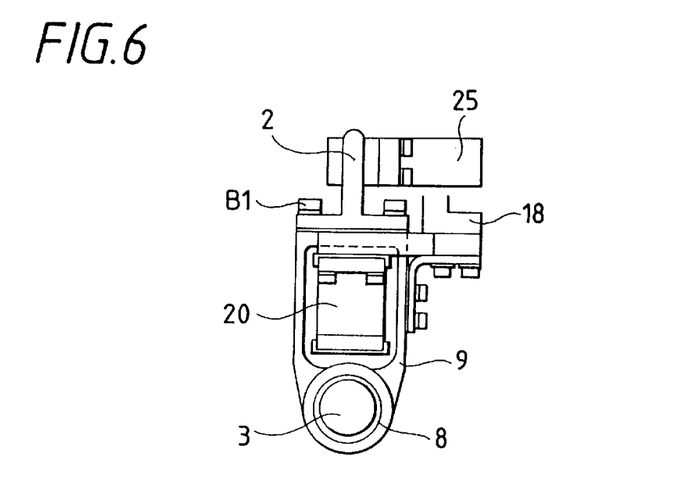
FIG. 6 is a view taken along line E—E of FIG. 5.

A third embodiment of the invention will be described next with reference to FIGS. 5 and 6. While an example of an axis feed method in which a welding current is supplied to the drive rod itself has been described in the aforementioned embodiments shown in FIGS. 1 to 4, an example in which a welding current is directly fed from a point holder attached to an end of the drive rod is proposed in the third embodiment of the invention shown in FIG. 5 other than the axis feed type. FIG. 6 is a view taken along line F—F of FIG. 5.

In this case, a support member 9 of the linear guide unit 8 is firmly secured to the gun bracket 5 by a plurality of bolts B5. The gun arm 2 is firmly secured to the support member 9 by the bolts B1 through an insulating member. A point holder 7 located on the end of the drive rod 3 is connected to one of the secondary terminals "a" of the welding transformer T through a flexible copper plate (flexible shunt) 20 and a water-cooled bus bar 18, whereas the gun arm 2 is connected to the other secondary terminal "a" through a flexible shunt 19 and a bus bar 25.

In case of the welding application which does not require around the electrode tips area so much room, that is, no interference between electrode tips and a workpiece or work fixture, the drive rod 3 is no longer used as a current conductor. Therefore, welding current can be fed through the route as described above.

While applied examples of the C-type spot welding gun have been described in the respective embodiments of the invention, the concepts of the invention may also be applied to stationary types of spot and projection welding machines through modifications.

As described above, according to the first aspect of the invention, the welding gun can be mounted on a robot arm by arbitrarily changing the gun bracket mounting position in the range of 360° so as to be concentric with the reduction gear output shaft center X independently of the gun mounting angles.

That is, functions of the motor-driven C-type spot welding gun are grouped into unit and standardized. Those units are drive unit, the welding unit and the bracket. The drive unit controls electrode tips to open and close to generate electrode force and includes an electric motor, a reduction gear, a swing lever, a link and a linear guide as main parts. The welding unit includes a welding transformer, secondary conductors which are bus bars and flexible shunts, gun arms, electrode tips and a point holder for conducting welding current to the welding point. The portions which must be designated and manufactured according to the customer's specification are included only in the welding unit. Further, main wearing and consuming parts are also included only in this unit. The bracket is standardized in basic function so that irrespective of the posture of the gun attached to the robot, the same bracket can be used. Accordingly, when the customer wants to change the attachment posture of the gun, a new bracket is not necessary as is the case with the conventional guns.

According to the second aspect of the invention, a link is interposed between the rear portion of the drive rod and either the output shaft of the reduction gear or the swing lever fixed to the main body case of the reduction gear, and the drive rod is linearly driven by swinging the swing lever by an electric motor. Therefore, the invention can overcome altogether: the problem caused by welding splashes due to poor welding splash resistance of the ball-bearing leadscrews and nuts that have been used for conventional spot welding machines and spot welding guns; the problem that the ball-bearing leadscrew and the nut have a large moment of inertia ($GD^2$); and the problem of restricted strokes.

Further, the drive unit of the present invention takes advantage of the merits of the reduction gear such as welding splash resistance, small $GD^2$, and nonrestriction of swinging angles. Here, the nonrestriction of swinging angles has the following meaning. That is, since the motor of the drive unit is servo controlled, the swing range of the swing lever is not basically restricted. Thus, a gun stroke determined by customer's specification, that is, a stroke length of a drive rod can be very easily and inexpensively dealt with by modification of single parts such as a swing lever, link and linear guide. Also, the drive unit of the invention employs motor output converting mechanisms such as the swing lever, the link, and the linear guide. Thus, it can dispense with the expensive conventional mechanism using a ball-bearing leadscrew and a nut. As a result, not only durability and productivity can be improved, but also the cost and term of manufacture of a C-type motor-driven spot welding gun can be significantly reduced.

Further, according to the third and fourth aspects of the invention, angular bearings can couple the link, the swing lever, and the drive rod with pre-load angular bearings. Therefore, the coupling portion can serve also as the guide for the drive rod, which in turn dispenses with a separately arranged guide mechanism required in the conventional examples. Hence, the structure can be simplified.

According to the fifth aspect of the invention, a welding transformer supported by the gun bracket is arranged in such a manner that a centerline Q along the length of the welding transformer crosses substantially at right angles (90°) to an axial centerline Z of the drive rod. As a result of this construction, the welding gun can be arranged compactly, which in turn allows weight balance with respect to the wrist of the robot arm to be implemented and hence allows a load applied to the wrist of the robot arm to be reduced. Further, since the welding transformer can be mounted sideways, the electric motor can be coupled to the input shaft of the reduction gear directly, which in turn allows $GD^2$ to be minimized.

According to the sixth aspect of the invention, in the case where the rear portion of the drive rod is connected to a secondary terminal of the welding transformer through a flexible copper plate, the curved portion of the flexible copper plate is extended along the rear portion of the gun. Therefore, the flexible copper plate does not enter into the throat of the gun. As a result, the flexible copper plate will not interfere with a workpiece, workpiece fixing tools, and the like around the electrode tips.

According to the seventh aspect of the invention, when the rotational output of the electric motor is converted to the electrode force of C-type spot welding gun through the reduction gear, the cam followers of the drive rod are incorporated into a cam groove formed in the swing lever. As a result, the drive rod is coupled to the swing lever, so that an arcuate motion is transmitted to the swing lever by the output of the reduction gear. Thus, a rotational motion is converted into a linear motion of the drive rod. Hence, the invention can substantially overcome: the problem caused by welding splashes due to poor welding splash resistance of the ball-bearing leadscrews and nuts that have been used for conventional spot welding machines and spot welding guns; the problem that the ball-bearing leadscrew and the nut have a large moment of inertia ($GD^2$); the problem of restricted strokes; and the problem of lubrication. Further, by coupling the swing lever to the drive rod through the cam mechanism, the coupling portion itself serves also as the guide for the drive rod. Hence, the structure of the guide mechanism can be simplified.

Further, according to the seventh aspect of the invention, the driving unit takes advantage of the merit of the reduction gear such as splash resistance, small $GD^2$, nonrestriction of electrode stroke and advantage of eliminating an expensive ball-bearing leadscrew. The variety of guns cause problems of production cost for a manufacturer and maintenance cost for a user. The motor-driven C-type spot welding gun of the present invention, improves on the conventional technical concept represented by the conventional guns with the pinion and rack driving method and another guns with the ball-bearing leadscrew driving method which have the above problems. The new technical concept explained with respect to the motor-driven C-type spot welding gun of the present invention can make large improvements in the cost and lifetime of the C-type spot welding gun by standardizing the respective gun functions.

What is claimed is:

1. A motor-driven resistance spot welding machine, comprising:

a gun bracket;

a gun arm having one of electrode tips and supported by the gun bracket;

a linear guide unit supported by the gun bracket or the gun arm;

a drive rod for driving the other of the electrode tips, the drive rod being guided and supported by the linear guide; and     a mechanism for linearly driving the drive rod including:

an electric motor for generating an electrode torque necessary for welding between the electrode tips;

a reduction gear for transmitting the motor output to the electrode tip of the drive rod; and         a swing member being supported by an output shaft of the reduction gear and being coupled to the drive rod;

wherein the drive mechanism is releasably mounted on the gun bracket so as to be concentric with a center of the output shaft of the reduction gear, so that the drive mechanism substantially constitutes a drive unit.

2. A motor-driven resistance spot welding machine, comprising:

a drive rod having one of electrode tips on an end thereof and making a linear motion;

a linear guide for guiding the linear motion of the drive rod, the linear guide including a bearing; and a reduction gear being supported by a gun arm or a gun bracket and having the other of the electrode tips; the drive rod being linearly driven in an electrode force direction by transmitting an output of an electric motor to the reduction gear;

a swing lever being secured either to an output shaft of the reduction gear or to a main body of the reduction gear, a rear portion of the drive rod being connected to the swing lever through a link;

whereby an arcuate motion is transmitted to the swing lever by an output of the electric motor, and is then converted into a linear motion of the drive rod by the link to thereby drive the drive rod so as to apply electrode force.

3. A motor-driven resistance spot welding machine according to claim 2, further comprising a coupling portion that couples the drive rod to the link, the coupling portion having a drive rod guide function preventing the drive rod to rotate.

4. A motor-driven resistance spot welding machine according to claim 3, further comprising angular bearings combined with the coupling portion; a pre-load being applied to the angular bearings to couple the link, the swing lever, and the drive rod to one another, so that the coupling portion serves also as drive rod guide means for preventing the drive rod to rotate.

5. A motor-driven resistance spot welding machine according to claim 2, further comprising a welding transformer supported by the gun bracket, the welding transformer being arranged in such a manner that a centerline along a length of the welding transformer crosses substantially at right angles to an axial centerline of the drive rod.

6. A motor-driven resistance spot welding machine according to claim 5, further comprising a flexible copper plate, a rear portion of the drive rod being connected to a secondary terminal of the welding transformer through the flexible copper plate.

7. A motor-driven resistance spot welding machine, comprising:

a drive rod having one of electrode tips on an end thereof and making a linear motion;

a bearing for linearly guiding the drive rod;

a reduction gear being supported by a gun arm or a gun bracket and having the other of the electrode tips, the drive rod being linearly driven in an electrode force direction by transmitting an output of an electric motor to the reduction gear;

cam followers arranged on a rear portion of the drive rod;

a swing lever secured either to an output shaft of the reduction gear or to a main body of the reduction gear;

wherein the cam followers of the drive rod are incorporated into a cam groove formed in the swing lever, whereby the drive rod is coupled to the swing lever, and an arcuate motion is thus transmitted to the swing lever by an output of the electric motor and is converted into a linear motion of the drive rod by a cam mechanism to thereby drive the drive rod so as to apply electrode force.

* * * * *